Dec. 13, 1932.  C. C. F. DI BITETTO  1,890,501
CONVERTIBLE VEHICLE BODY
Filed Jan. 25, 1929   4 Sheets-Sheet 1
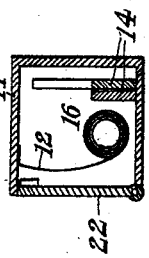
Fig. 5
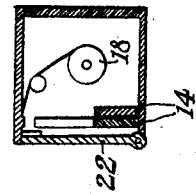
Fig. 6
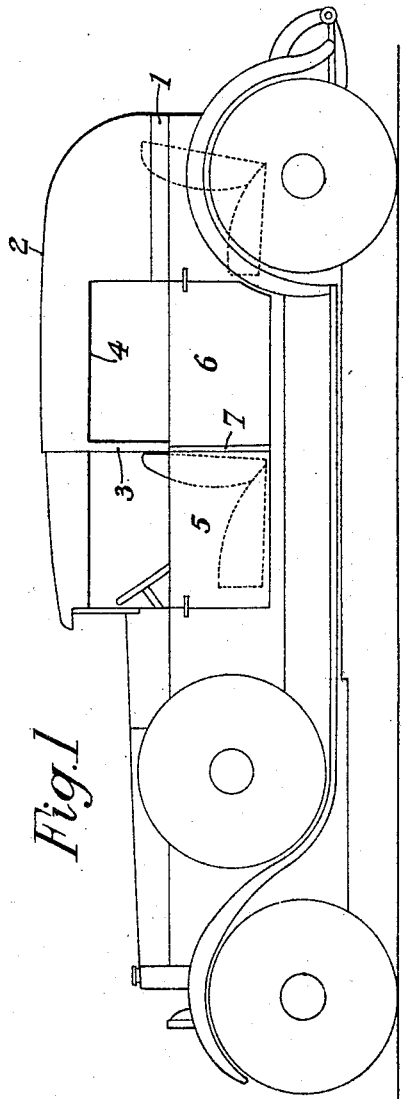
Fig. 1
Fig. 2
C. C. F. Di Bitetto
INVENTOR
By: Marks & Clerk
Attys.

Dec. 13, 1932.   C. C. F. DI BITETTO   1,890,501
CONVERTIBLE VEHICLE BODY
Filed Jan. 25, 1929   4 Sheets-Sheet 2
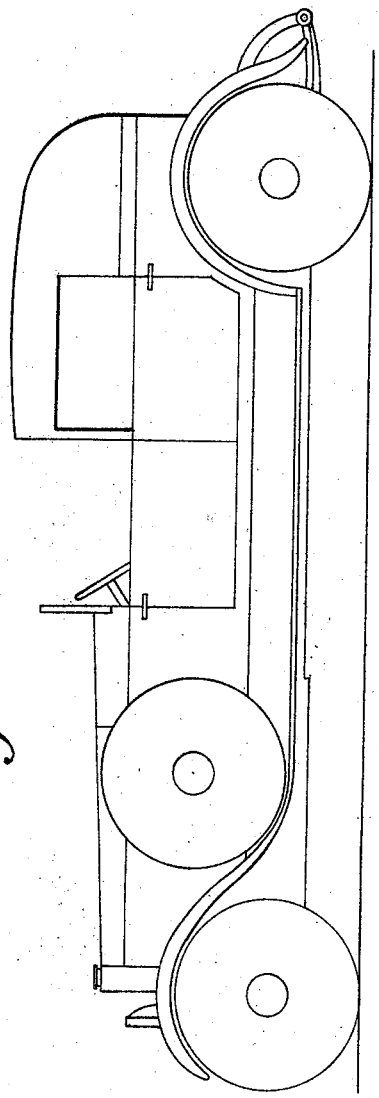
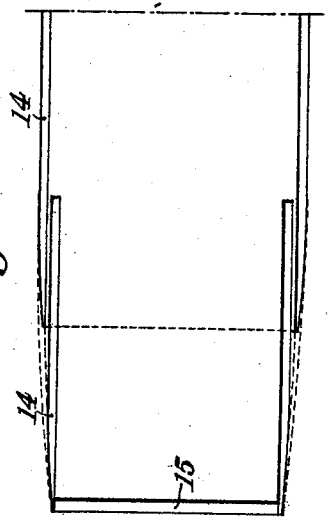
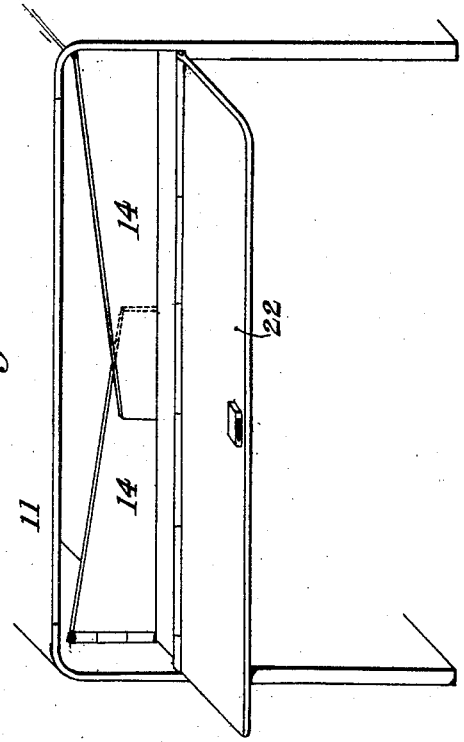
C. C. F. Di Bitetto
INVENTOR
By: Marks & Clark
Attys.

Dec. 13, 1932. C. C. F. DI BITETTO 1,890,501
CONVERTIBLE VEHICLE BODY
Filed Jan. 25, 1929 4 Sheets-Sheet 3
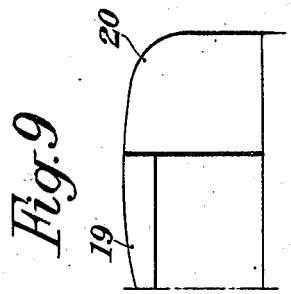
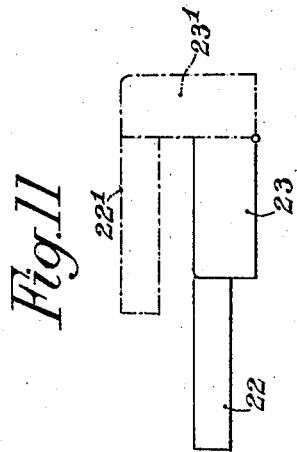
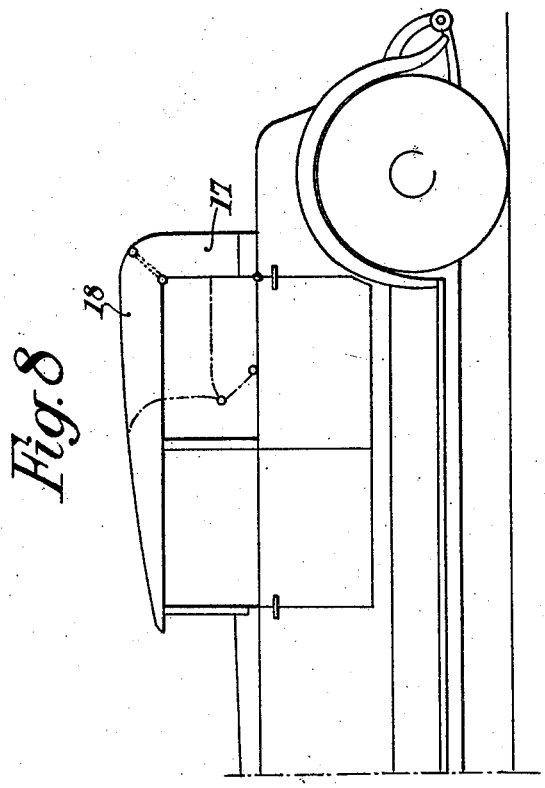
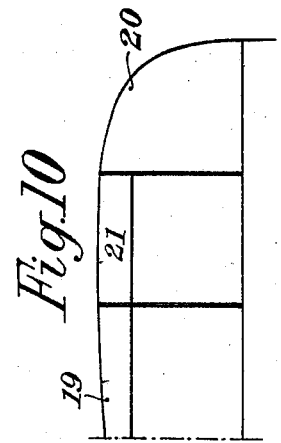
C. C. F. Di Bitetto
INVENTOR
By: Marks & Clerk
Attys.

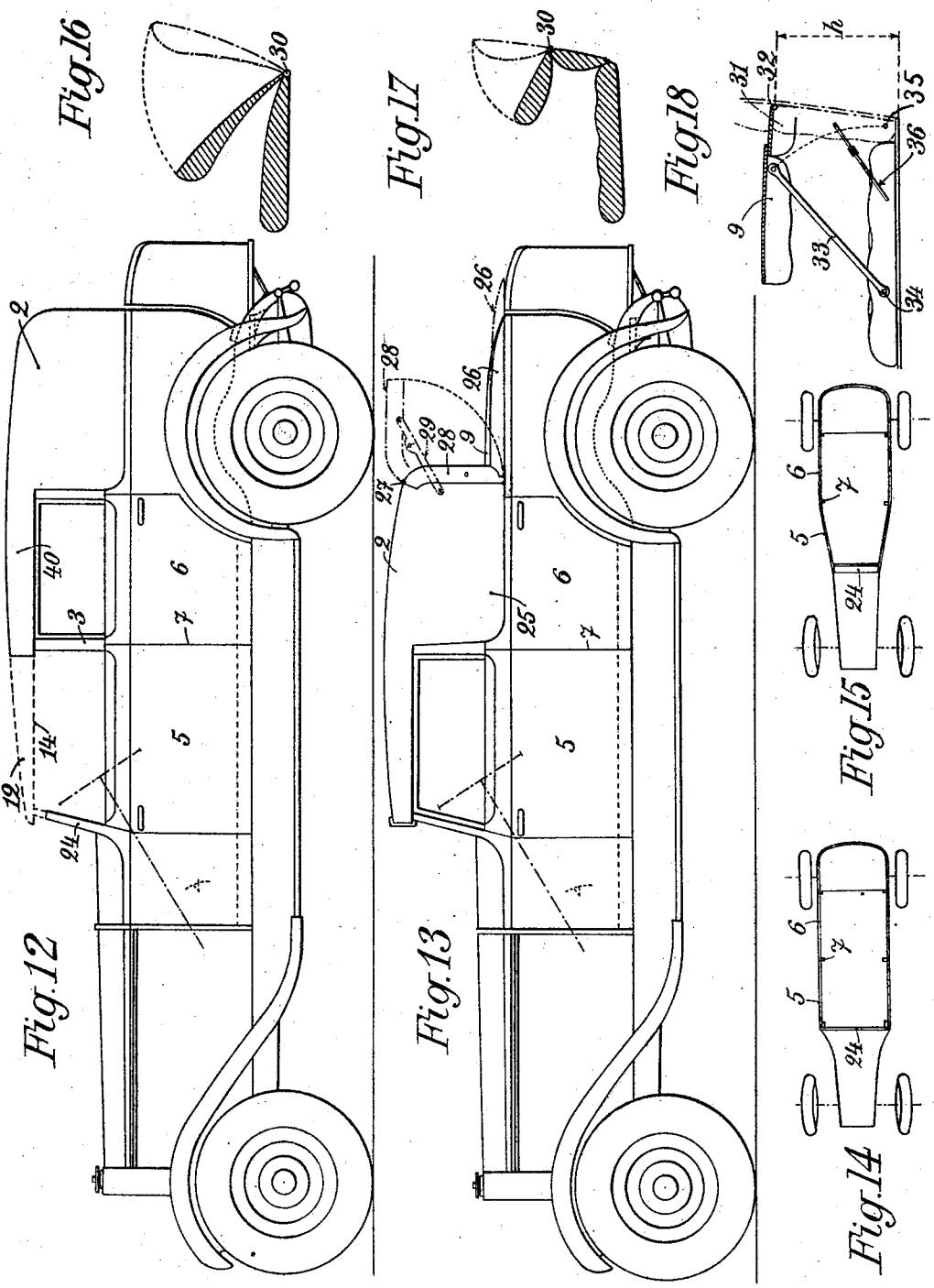

Patented Dec. 13, 1932

1,890,501

UNITED STATES PATENT OFFICE

CARLO CITO FILOMARINO DI BITETTO, OF PARIS, FRANCE

CONVERTIBLE VEHICLE BODY

Application filed January 25, 1929, Serial No. 335,072, and in France March 30, 1928.

This invention relates to a motor vehicle body readily and easily convertible from a town cabriolet to a two seater inside drive carbriolet, or a sedan, or a torpedo, but the essential conversions are from cabriolet to two seater cabriolet and to torpedo. The object of the invention is to obtain the above mentioned conversions by the combination of an ordinary body of a cabriolet convertible into a sedan (that is to say with a glass plate in each door) with a hood (also of the type usual in this kind of car body, that is to say having a front extension) which, if desired, can be made collapsible for obtaining a torpedo body and movable from the rear to the front and vice versa for obtaining the two seater inside drive cabriolet, the town cabriolet and also the sedan of the front extension of the hood is used.

The accompanying drawings show by way of example various embodiments of the invention according to a motor car.

Figs. 1 to 3 are views in side elevation showing respectively the vehicle arranged for inside drive, two seater cabriolet, and cabriolet.

Fig. 4 is a front view of the canopy.

Fig. 5 is a cross section of the same.

Fig. 6 is a like view relative to a modification.

Fig. 7 is a plan view of a second modification.

Figs. 8, 9, 10 and 11 show other embodiments.

Figs. 12 and 13 show in side elevation, the vehicle arranged for inside drive and for a two or a four seater cabriolet.

Figs. 14 and 15 are diagrammatic views of modified constructions.

Figs. 16, 17, 18 show forms of construction of the rear seat.

In these forms of construction, the upper edges of the lower part of the body, from the front part to the rounded back part, are straight and parallel to one another, in order to provide for the sliding action. Upon the said edges is movable by sliding or otherwise, a movable device comprising a rigid base 1 at the rear, and a hood 2 supported at the front by the two columns 3. The said hood may be collapsible if it is desired to obtain an open car at will, or it may be given a definite form.

At the rear of the columns 3 are provided the places for the glass windows 4 with recesses and supporting arms in the usual manner.

In all cases, the lower part of the body comprises two similar doors 5 and 6 which are preferably hinged to a common column 7. The two glass windows may be inserted into either of the spaces 4 as desired.

Fastening devices are employed to securely hold the movable device to the edges of the lower part of the body, either at the extreme rear or at the front, and in this case the columns 3 make contact with the wind screen.

In the first case, this forms the coupé as shown in Fig. 3, and in the second case, it forms the two seater coupé as shown in Fig. 2. In this latter construction, the rear part 8 of the lower part of the body is closed by the back part 9 of the rear seat, for example, and optionally by a pivoting flap 10 whose height will not attain that of the rear window, so as to offer no obstruction in the case of Figs. 1 or 3.

To obtain the inside drive (Fig. 1), the vehicle top forms a box 11 (Figs. 4 and 5) in which are concealed on the one hand the apron 12 which is secured to the upper part of said box at one end and at the other end to a bar 16 which can be attached to the wind screen, and on the other hand two pivoted arms 14 whose ends can be attached to the columns of the wind screen and to which the apron can be secured by suitable means. The said vehicle top is closed at the front by a flap 22 hinged at the bottom.

This arrangement provides an approved coupé, thus concealing all the parts which form the opening front, and providing a transverse arch for the leather of the apron. When the apron is no longer in use, it is rolled upon the bar 16 as shown in Fig. 5.

Fig. 6 shows a modification of this device, in which the apron is mounted on a winding drum 18, or a simple roller operated by a removable handle.

Fig. 7 shows a modification in which the two arms 14 are connected together by a crosspiece 15, and are slidable in or upon the box 11 after the manner of a drawer. Herein the leather of the apron may be secured to the said arms or may be attached to the cross bar and at the upper part of the canopy, as shown in Fig. 5.

In the construction shown in Fig. 8, the rear part of the hood consists of two panels 17—18 hinged together.

This will afford the inside drive as shown in the full lines, or otherwise the panel 17 can be placed horizontally against the lower part of the body, and the panel 18 placed vertically, thus obtaining the two seater coupé.

To provide the ordinary coupé or cabriolet, it is simply necessary to slide back the device forming the two seater coupé.

In Figs. 9 and 10, the top 19 and the rear part of the hood 20 are distinct, and can be separated as shown in Fig. 10, and between them is disposed an additional panel 21. The arms 19—21 may be hinged to the part 20 or may be mounted by telescoping on said part. They may also be hinged or telescoped so as to extend to the front or rear, so as to employ only one pair of arms, or two arms 19, or two arms 21 and a single leather piece.

Fig. 11 shows the construction obtained by the use of the parts 22—23 concealed at the rear of the body, of which they form the cover, and when raised into the position shown in the dotted lines $22^1$—$23^1$ they form a veritable hood which may be slid into the suitable position to form the desired carriage-work.

In the construction shown in Figs. 12 and 13, the columns 3 are distinct from the movable part, and are secured to the stationary part of the body. They remain visible when the body is arranged for inside drive or as a four seater coupé with hood, but when the body is used as a two-seater or as a torpedo, they disappear into the lower part of this body, according to the usual practice for coupés with removable hoods.

The columns 3 may also be secured to the movable part, while being movable themselves with reference to the latter, that is, they may be lowered, or may revolve or slide upon this movable part. This is preferably done in the case of a false cabriolet, that is, one which carries a permanent hood. In this case as before, it is not necessary that the columns 3 should slide upon the edges of the body. In these conditions, the sliding movement of the hood 2 on the upper edges of the lower part of the body is assured solely by the rigid shoulder of the hood, and the columns 3 need no longer slide upon these edges.

In all cases, the front of the permanent part of the body need not be rectilinear from the front part to the rounded rear end as shown in Fig. 10, but only from the column of the body 7 to which may be hinged the two front and rear doors 5—6. The whole front part of the vehicle may have a curved outline, and the front and rear doors are now of equal construction and placed in line, and the wind screen 24 may be inclined if this position forms a more attractive body or offers other advantages, such as in the case of unlike doors, to compensate for the smaller spread of the canopy top in covering the front places. To cover this deficit, I may employ false uprights which revolve or fold down in front of the columns 3, the canopy being longer than the rear doors.

If the front of the vehicle has a curved outline, the body will be narrower adjacent the wind screen 24 than next the uprights 7, and in this case, since the arms 14 holding the apron 12 are pivoted at their rear ends, they will be placed in a converging position so as to compensate for this difference in width. It will however be necessary to provide below the front part 40 of the hood, suitable additional arms pivoted at the rear upon vertical axles so as to form supports for the glass windows of the front doors, in case the hood should be moved forward, and herein the said additional arms are brought into the convergent position, since the front doors converge towards the wind screen.

The rigid shoulder of the hood may be slidable upon the edges of the lower part of the body and of the rear doors. The said shoulder is preferably concealed by a rounded part 25 extending from the hood. This rounded part may be flexible, for instance of leather, to reduce the thickness, whilst the frame of the hood stops at the height of the upper edges of the rear doors, and the leather piece is extended by a flap which assures the complete closing as far as the top strip, and allows entrance.

In the construction shown in Fig. 12, two arms 26 termed "roadster arms" are disposed on the rear edges of the lower part of the body and make contact with the hood when it is in the position for the two seater coupé, or cabriolet. The back 9 of the rear seats, or the cover if the seat back is not secured to this cover, will now rest upon the said arms.

The rounded form of the said arms is extended by the round part of said seat back, so as to obtain the proper form for the rear of the vehicle. Roller races are provided in the arms 26, to facilitate the motion of the hood.

The back of the top, that is its rear part 28, turns on a horizontal axle 27 and may be maintained in the horizontal position by the pivoted arms 29 as shown in the dot-and-dash lines in Fig. 13. In this position, it no longer obstructs the view of the occupants, and they will receive more air. It may be so arranged as to be withdrawn within the hood.

For the proper extension of this rear part 28, the arms 26 are slidable on the edges of the lower part of the body and may assume the position shown in the dot-and-dash lines.

The operation necessary to change from the position for the two seater coupé to the four seater coupé is very simple, and is performed as follows.

The two roadster arms 26 are slid to the rear.

The back 28 of the hood is turned to the rear and is held in this position by the arms 29.

The roadster arms are then brought back to their original position.

The whole hood is slid back, and its extending rounded form conceals the roadster arms.

The back of the hood is then returned to position.

The columns 3 are brought out of their recess and secured to the hood, or they are removed from the canopy top and secured to the body.

The rear seats are then operated, that is they are turned about, and if the rear seat back is distinct from the cover of the roadster, this cover is moved in the first place, and the glass windows are then placed in position, thus completing the operation.

In the majority of the two seated coupés, the angle between the rear seat back and the horizontal (Figs. 16—17) is considerable, so that the seat back can be readily turned about an axle situated at the lower rear part, since this inclination brings the center of gravity nearer the pivoting part of the axle used for the rotation. This is not the same for the carriagework according to the invention, and moreover, if the seat back were only turned about its rear part, this would leave a height $h$ (Fig. 18) which is not upholstered or would require a break in the upholstering which would be most uncomfortable for the users of such seats.

These drawbacks are obviated in a construction, according to the invention, in which (Fig. 18) the cover of the rear places is divided into two juxtaposed parts; one part 31 is pivoted at its rear side 32, and the other part 9 forms the upholstered rear seat back and is connected to the main frame of the seat by an arm 33 turning about a point 34 so selected that the seat back will be in its proper place after rotation. The inclination of the said seat back may be changed if desired by a rotation on the axle 35, the amount being regulated by the straps 36.

I claim:

Convertible vehicle body comprising the combination of a body having on either side two doors with vertically sliding glass plates, and a post between these doors, movable columns capable of being arranged above the said posts of the body, and adapted to guide the glass plates of the front and rear doors, a hood movable forwardly and rearwardly and having a rear part, sides adapted to fit on the upper edge of the body and a top extending forwardly beyond the said sides on a length substantially equal to the width of each of the said doors, each of the said sides having its front edge adapted to guide the glass plate of the rear or front door according to the position of the said movable hood and means for closing the rear part of the body when the hood is at the front part of the latter.

In testimony whereof I have hereunto affixed my signature.

CARLO CITO FILOMARINO di BITETTO.